United States Patent [19]
D'Agostino

[11] 3,739,200
[45] June 12, 1973

[54] FET INTERFACE CIRCUIT

[75] Inventor: Michael V. D'Agostino, Mercerville, N.J.

[73] Assignee: Michael D'Agostino, Mercerville, N.J. Arthur Lief, Merrick, Hershel Harrison, and James Armour, both of New York, all of N.Y.

[22] Filed: Sept. 27, 1971

[21] Appl. No.: 184,000

[52] U.S. Cl. .................................. 307/304, 307/251
[51] Int. Cl. .............................................. H03k 3/26
[58] Field of Search............... 307/205, 221 C, 251, 307/279, 304; 350/160 LC; 328/53

[56] References Cited

UNITED STATES PATENTS

| | | | |
|---|---|---|---|
| 3,588,846 | 6/1971 | Linton | 307/279 |
| 3,539,839 | 11/1970 | Igarashi | 307/279 |
| 3,514,765 | 5/1970 | Christensen | 307/251 |
| 3,500,062 | 3/1970 | Annis | 307/304 |
| 3,551,689 | 12/1970 | Zanoni | 350/160 LC |

OTHER PUBLICATIONS

Dennard, "FET Memory Cell Using Diodes as Load Devices" Vol. 11, No. 6, IBM Technical Disclosure Bulletin, pages 592–593, Nov. 1968.

Bardell, "Static Mos Memory," IEEE Digest 3/22/71, pages 32 and 33.

Spaupinato, "FET Associative Memory Cell" Vol. 12, No. 10, March, 1970, IBM Technical Disclosure Bulletin, pages 1634, 1635.

Karp, "Dynamic Refresh Memories," IEEE Digest 3/22/71, pages 36 and 37.

*Primary Examiner*—John W. Huckert
*Assistant Examiner*—R. E. Hart
*Attorney*—Robert R. Hubbard

[57] ABSTRACT

Field-effect transistor (FET) interface circuit for interfacing low power circuits with higher power circuits. The illustrated circuit employs complementary metal oxide semiconductor (C-MOS) devices to accomplish the interface function to a liquid crystal display element with minimal power dissipation and complexity.

6 Claims, 3 Drawing Figures

INVENTOR
MICHAEL V. D'AGOSTINO
BY Robert R. Hubbard
ATTORNEY

INVENTOR
MICHAEL V. D'AGOSTINO
BY Robert R. Hubbard
ATTORNEY

FET INTERFACE CIRCUIT

BACKGROUND OF INVENTION

A. Field of Invention

The present invention relates to new and improved field-effect transistor circuitry and in particular to field-effect transistor circuitry which responds to low valued input signals to control the connection of a relatively higher valued signal to a load.

With the advent of low power circuit technologies, such as bipolar transistors, insulated gate field-effect transistors, and others it has become necessary to provide an interface between such low power circuits and various higher power circuits, such as digital to analog converters, liquid crystal elements, light emitting diodes, and others. For example, in one design of an electronic watch, low voltage (on the order of 1.5 to 3.0 volts) complementary metal oxide semiconductor (C-MOS) circuitry is employed to control the connection of a higher valued voltage (20 volts or so) to a liquid crystal display element which indicates the time.

B. Prior Art

It is known to use a field-effect transistor (FET) as a transmission gate or series switch to make or break a connection between a signal source and a load. One prior solution to the low power to high power interface problem is to eliminate it altogether by operating the entire system at the higher voltage. This results in rather high power dissipation since power is proportional to the square of the voltage. This solution is unacceptable in battery operated or low power applications such as electronic watches.

Another prior solution is to employ a voltage amplifier between the low power circuitry and the series FET switch. In prior art voltage amplifiers of which the inventor is aware, a steady state current is drawn through the amplifying device and its load during the "on" state of the switch. This results in undesirable power dissipation.

BRIEF SUMMARY OF INVENTION

An object of this invention is to provide new and improved field-effect transistor circuitry.

Another object is to provide a novel interface circuit which provides an interface function between circuitry employing low valued signals and circuit elements employing a relatively high valued signal.

Still another object is to provide a novel switching circuit which responds to low valued signals to control the connection of a relatively high valued signal in either a.c. or d.c. fashion to a load.

Yet another object is to provide a novel switching circuit having a design flexibility which is adaptable to threshold or operating voltage changes in field-effect transistor technology as well as to changes in the high voltage requirement for the load.

A further object is to provide a new and improved field-effect transistor interface circuit which provides the interface function between a field-effect transistor signal processor and a liquid crystal display.

Still a further object is to provide new and improved field-effect transistor circuitry for controlling the making and breaking of a series field-effect transistor switch.

Yet a further object is to provide new and improved field-effect transistor circuitry for multiplexing a single terminal between a plurality of other terminals and vice versa.

Still one more object is to provide a field-effect transistor circuit which employs complementary conductivity type transistors so as to take advantage of low power dissipation.

In brief, FET circuitry embodying the invention includes an FET switch connected in series with a load and the higher power signal source. The source and drain leads of a second FET are coupled between the source and gate leads of the series FET. An input control circuit is coupled to the gate leads of both FET's and is arranged to respond to one level of the low valued input signal to turn the second FET "on" such that the larger valued signal is applied to both the source and gate leads of the series FET to thereby hold it in an "off" condition. The control circuit also responds to a change from the one to the other level of the low valued signal to turn the series FET "on." A feedback path is coupled between the drain lead of the series FET and the gate lead of the second FET and is arranged to charge the parasitic capacitance associated with the gate lead of the second FET to a value which renders the second FET non-conductive.

The series and second FET's are of the same conductivity type. Complementary FET operation is achieved by employing a second conductivity type FET as a source follower in the feedback path and by employing other second conductivity type FET's in the input control circuit.

In one embodiment of the invention a plurality of the FET circuits are responsive to a like plurality of low valued input signal sources to connect the higher valued signal to a like plurality of loads. The loads in this embodiment may take the form of different plates of a liquid crystal display.

BRIEF DESCRIPTION OF THE DRAWING

In the accompanying drawing, like reference characters denote the components, and.

DESCRIPTION OF PREFERRED EMBODIMENT

It is contemplated that FET circuits embodying the present invention can be employed with the low power circuits of any circuit technology which are required to control any desired higher power circuit. By way of example and completeness of description, the invention is illustrated herein for a liquid crystal display embodiment for an electronic watch or clock application.

Figure 1:
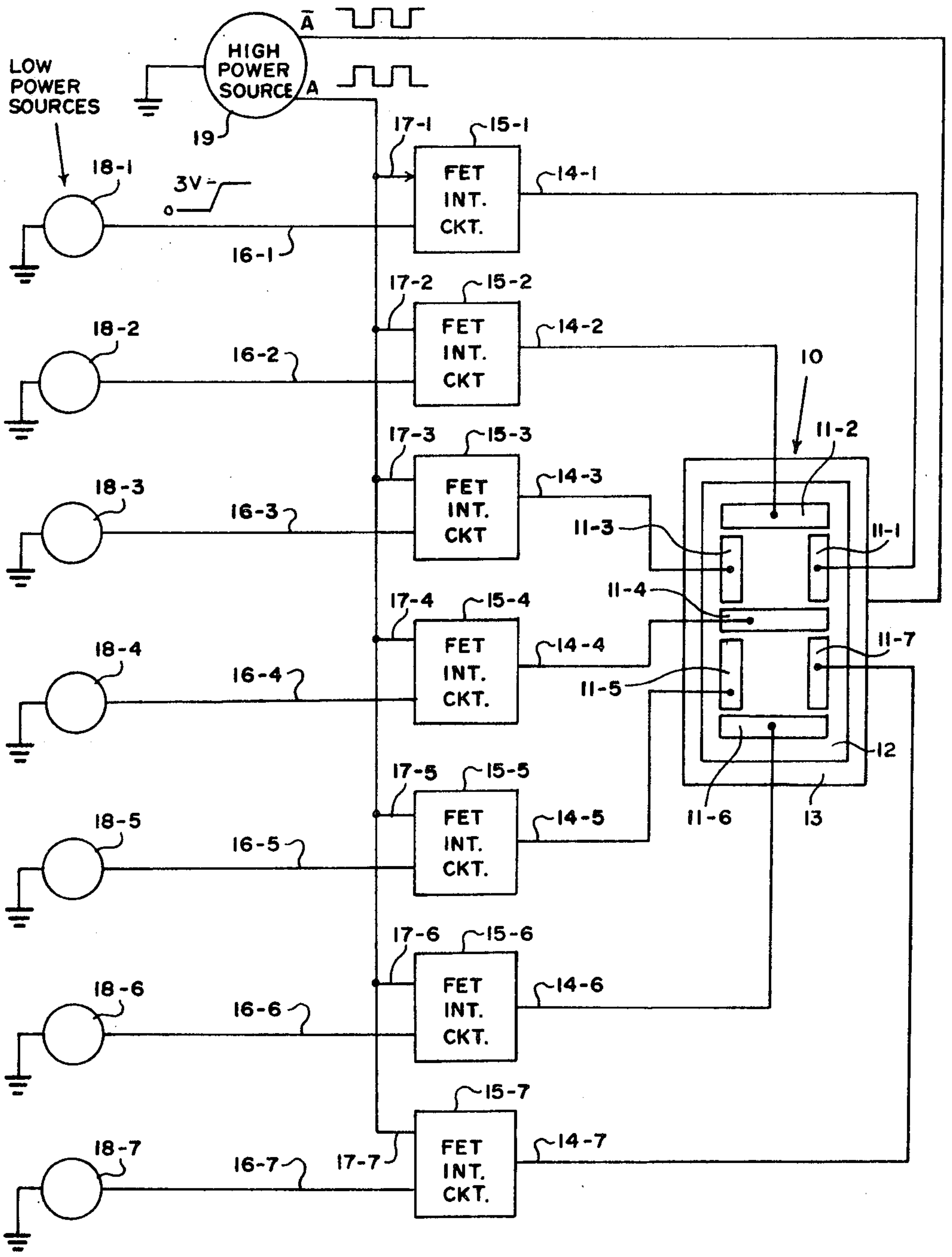
FIG. 1 is a block diagram of a preferred embodiment of the invention employing a plurality of FET circuits responsive to low power signals to couple a high power signal to the different plates of a liquid crystal display.

With reference now to FIG. 1, there is shown a liquid crystal display device 10 which is capable of displaying any of the numeric characters 0 through 9 by means of a pattern of seven transparent conductive segments 11-1 to 11-7. A crystal element 12 is sandwiched between the seven segment pattern and a conductive back plate 13. The seven segments are each operable as an independent liquid crystal cell such that when properly addressed with a voltage, a numeric character is caused to reflect ambient light, thereby illuminating the addressed segments.

The segments 11–1 through 11–7 are connected to the output leads 14–1 through 14–7 of FET interface circuits 15–1 through 15–7, respectively. The FET interface circuits 15–1 through 15–7 are arranged to respond to low power segment address sources 18–1 through 18–7, respectively, to couple a high power signal A from a source 19 to the addressed segments. To this end, the low power address sources 18–1 through 18–7 are connected to input leads 16–1 through 16–7, respectively, of the interface circuits. The high power signal source 19 is coupled to the input leads 17–1 through 17–7 of the interface circuits. The low power signal sources and the high power source are further connected to a suitable point of reference potential, illustrated as circuit ground. The display device back plate 13 is connected to the complement A of the high voltage signal so that the liquid crystal display is operated in an a.c. mode.

The display device 10 thus forms one of the time indicating digits for the electronic watch or clock. The other digits (not shown) include similar numbers of FET interface circuits and low power address sources. The power address sources are included in the clock or watch timing signal processor (not shown). For signal processor designs which employ C-MOS technology, the address signals provided by the low power sources have a signal swing between 0 and 3 volts for presently available MOS devices. On the other hand, it is not uncommon for liquid crystal display plate segments to require an operating voltage on the order of 21 volts, which may be either a.c. or d.c. In one battery powered electronic watch design, the high power source provides, to the liquid crystal display, a 64 Hz 22-volt peak-to-peak square wave which is derived from a stable crystal oscillator. In a clock, the high power signal could be derived from a 60 Hz line signal.

Figure 2:
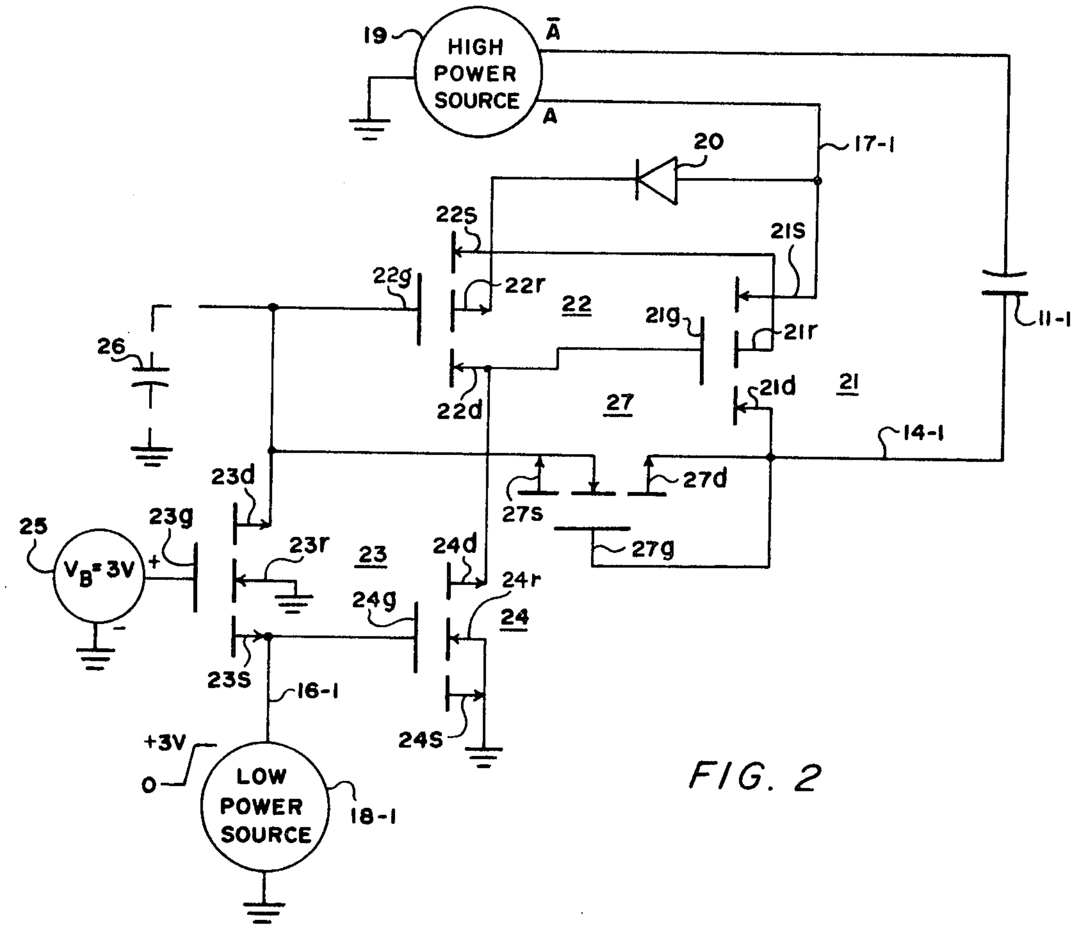
FIG. 2 is a circuit diagram of an FET circuit embodying the invention.

Each of the FET interface circuits is of the form shown in FIG. 2 for the FET circuit 15–1. As shown in FIG. 2, the FET interface circuit includes an MOS device 21 which is arranged as a series switch between the high power source 19 and the liquid crystal load 11–1 which is shown symbollically as a capacitor. To this end, the source lead 21*s* is connected to receive the high power signal A of source 19 and the drain lead 21*d* is connected to the display segment 11–1. A second MOS 22 has its drain lead 22*d* connected to the gate lead 21*g* of the series MOS 21. The source lead 22*s* of MOS 22 is connected to receive the high power signal A of source 19 via a silicon diode 20. The substrates 21r and 22r of the MOS 21 and 22 are also connected to receive the high power signal A of source 19 via diode 20. The MOS 21 and 22 are both of the same conductivity type, namely P-channel devices.

An input control circuit including opposite conductivity type MOS 23 and 24 is arranged to respond to the lower (0 volt) level of the low power signal to turn the MOS 22 "on" whereby the high power signal is applied to the gate lead 21g of MOS 21 via the source to drain path of MOS 22. To this end, the MOS 23 has its drain lead 23*d* connected to the gate lead 22*g* of MOS 22; its source lead 23*s*, to the low power signal source 18–1; and its gate lead 23*g* to a bias source 25. The bias source 25, which has its other lead grounded, has the same value (*Vb*=3 volts) as the higher level of the low power signal. This assures that the MOS 23 is turned on when the low power signal is at 0 volt.

The input control also includes MOS 24 which responds to the 0 to 3 volts transition of the low power signal to provide a discharge path for the gate lead of MOS 21, to thereby turn the latter MOS "on." To this end, MOS 24 has its drain lead 24*d* connected to the gate lead 21*g* of MOS 21: its source lead 24*s*, *to ground; and its gate lead* 24*g*, to the low power source. The substrates 23*r* and 24*r* are both grounded.

A feedback circuit including MOS 27 is arranged to assure that MOS 22 is turned "off" when the series MOS 21 is turned "on." The MOS 27 is connected in the source follower configuration whereby its drain lead 27*d and its gate lead* 27*g* are connected to the drain lead 21*d* of MOS 21 and its source lead 27*s* is connected to the gate lead 22*g* of MOS 22. The substrate 27*r* is also connected to the gate lead 22*g*.

For the nonselected condition, the low power signal is at 0 volt. With 0 volt at both its gate ad source, MOS 24 is turned "off" to thereby provide a high impedance between the gate of the series MOS 21 and ground. With a 3-volt difference between its gate and source, MOS 23 is turned "on" to provide a low impedance discharge path for the gate of MOS 22. This places MOS 22 in the bias "on" condition. The high power signal A (11 volts) is coupled via diode 20 to the source 22*s* of MOS 22. This signal also appears at the drain of MOS 22 due to its bias "on" condition. Since the drain of MOS 22 is connected to the gate of MOS 21, the high power signals are applied to both the gate and source of MOS 21 to dynamically hold it "off." Under these conditions the source follower feedback MOS 27 is "off" with its source and substrate tied to ground via the source to drain path of MOS 23. This allows the display segment 11–1 to also assume ground potential. There are no direct current paths between the high power signal source or the bias source and ground for these nonselected conditions.

For the select condition, the low power signal changes to 3 volts. This causes MOS 23 to turn "off" and MOS 24 to turn "on." With MOS 24 turned "on" the gate of MOS 21 is coupled to ground via the source to drain path of MOS 24. This turns MOS 21 "on" to couple the high power source 19 to the display segment 11–1. During the nonselect condition, the gate of MOS 22 had been tied to ground via MOS 23. With MOS 23 now turned "off," the gate of MOS 22 is held at ground by parasitic capacitance 26. However, any positive excursion of the high power signal will be fed through the source to drain path of MOS 21 and also through the source to drain path of the source follower 27 to charge up the parasitic capacitance 26. Thus, the first positive voltage excursion passed by the series MOS 21 in response to the positive going transition of the low power signal charges up the capacitance 26 to thereby turn the MOS 22 "off." All subsequent positive excursions passing through MOS 21 reinforce the positive charge on capacitance 26 to maintain MOS 22 turned "off." It should be noted that current cannot discharge from capacitance 26 to the load 11–1 due to the polarity of MOS 27.

Because MOS 27 is operated in the source follower mode, there is a voltage level shift between the drain of MOS 21 and the gate of MOS 22 equal to threshold voltage of MOS 27. If the P channel threshold of MOS 22 is 1.0 volt or more greater than the N channel threshold of MOS 27, the voltage transfer in the feedback path would be sufficient to guarantee the holding off of MOS 22 under all conditions of operation. However, this threshold differential would require special C-MOS processing controls which would compromise the economic attractiveness of the circuits embodying the invention. To compensate for the voltage level shift of the source follower, diode 20 is used to level shift the source voltage of MOS 22 thus guaranteeing an "off" source-to-gate potential for MOS 22 when the source follower 27 has charged up the capacitance 26.

It is also worth noting that diode 20 also level shifts the substrate of MOS 21 making its threshold voltage artificially larger. This is to compensate for the forward voltage drop of the diode when MOS 22 is "on." Therefore the diode satisfies a dual purpose. In the select condition, a dynamic chain is formed with pulses applied to the source of MOS 21 and 22, passing through MOS 21 and 27 to be applied simultaneously to the gate and source of MOS 22 to hold it "off." This dynamic biassing is far superior to having the source of MOS 22 at a fixed potential of say 20 volts. If this were the case, MOS 22 could be turned "on" by a negative charge lowering the potential of capacitance 26 by as little as 1.0 volt. Then MOS 22 and 24 would provide a conductive path between the 20 volt bias and ground causing heavy currents to flow.

Figure 3:
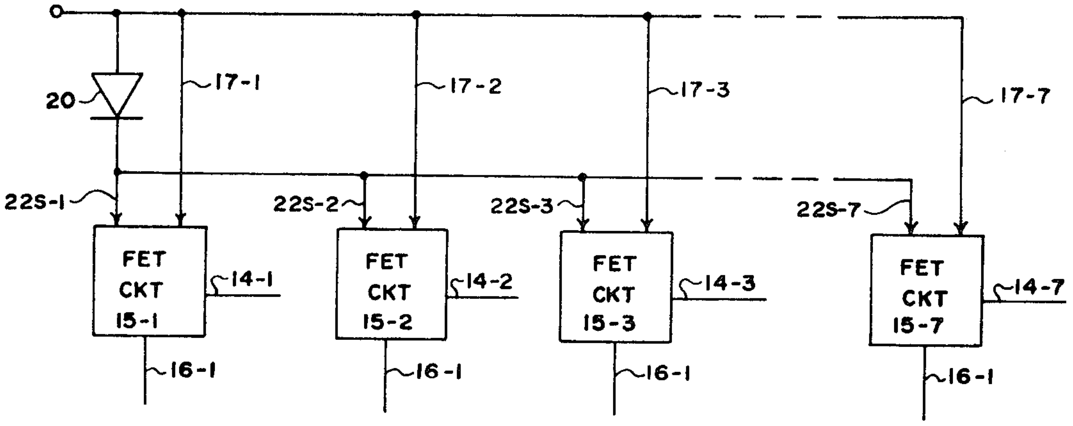
FIG. 3 is a block diagram, in part, and a circuit schematic, in part, of another embodiment of the invention.

Rather than having their own diode 20, the FET circuits 15–1 through 15–7 may share a single diode 20 as shown in FIG. 3. For this embodiment, the diode 20 is connected between the high power source and the MOS source leads 22*s*-1 through 22*s*-7 of the FET circuits 15–1 though 15–7.

There has been described a novel and improved FET low to high power interface circuit which provides the interface function with minimal power dissipation. The FET interface circuit has a design flexibility which is adaptable to any low power circuit technology and to changes in the threshold or operating voltage requirements of either the low power circuit or of the higher power circuit.

The FET interface circuit can be employed not only for the illustrated case of a 0 to +11–volt signal being applied in complementary fashion across the load to provide an alternating current through the liquid crystal elements, but also with a 0 to +22 volt signal being applied through the interface circuit when the common terminal of the liquid crystal display (or load) is at ground potential.

What is claimed is:

1. A switching circuit responsive to a first source of bilevel input signal having relatively small amplitude swing to control the coupling of a second source of signal having a relatively larger amplitude value than either of the bilevel amplitude values to a load, said circuit comprising:

first means for coupling said load and said second signal source in series with the source and drain leads of a first field-effect transistor;

second means for coupling the source and drain leads of a second field-effect transistor between the source and the gate of the first transistor;

an input control circuit coupled to the gate and drain leads of the second transistor and arranged to respond to one level of the input signal to turn said second transistor "on" such that the larger valued signal is applied to both the source and gate leads of the first transistor to thereby hold said first transistor in an "off" condition, said control circuit also responding to a change from said one to the other level of said input signal to turn the first transistor "on;" said control circuit including third and fourth field-effect transistors, the source and drain leads of the third transistor being coupled between the gate lead of the second transistor and the first signal source, the gate lead of the third transistor being coupled to a bias source, the source and drain leads of the fourth transistor being coupled between the gate lead of the first transistor and a point of reference potential, and the gate lead of the fourth transistor being coupled to said first signal source; and a feedback path coupled between the drain lead of the first transistor and gate lead of the second transistor and arranged to respond to the "on" condition of the first transistor to charge the parasitic capacitance associated with the gate lead of the second transistor to a value which renders the second transistor nonconductive.

2. The invention as set forth in claim 1 wherein said feedback path includes a fifth field-effect transistor arranged in a source follower configuration.

3. The invention as set forth in claim 2 wherein said first and second transistors are of a first conductivity type and the third, fourth and fifth transistors are of a second conductivity type.

4. The invention as set forth in claim 3 wherein said first coupling means includes a diode connected between the source leads of the first and second transistors.

5. The invention as set forth in claim 4 wherein said load is one of a plurality of loads, said first source is one of a like plurality of such sources, and said switching circuit is one of a like plurality of such circuits which are arranged to respond to different ones of the first source to couple said second signal source to corresponding ones of said loads; and wherein the first coupling means all said switching circuits includes a diode circuit shared by all said switching circuits.

6. The invention as set forth in claim 5 wherein said loads comprise different plates of a liquid crystal display.

* * * * *